April 11, 1961 W. C. BROWN 2,979,681
SINE/COSINE POTENTIOMETER
Filed Sept. 1, 1959 2 Sheets-Sheet 1

Inventor
William C. Brown
By Stevens Davis Miller & Mosher
Attorneys

April 11, 1961   W. C. BROWN   2,979,681
SINE/COSINE POTENTIOMETER
Filed Sept. 1, 1959   2 Sheets-Sheet 2

Inventor
William C. Brown
By Stevens Davis Miller & Mosher
Attorneys 2,979,681
Patented Apr. 11, 1961

2,979,681
SINE/COSINE POTENTIOMETER

William C. Brown, Ottawa, Ontario, Canada, assignor to National Research Council, Ottawa, Ontario, Canada, a corporation of Canada Filed Sept. 1, 1959, Ser. No. 837,523

5 Claims. (Cl. 338—89)

The present invention relates to a variable resistance whose value is a linear function of the sine or cosine of the angle through which its shaft is rotated.

Sine and cosine resistances are well known, and the problem of producing a satisfactory article has been approached in many ways. One of the accurate methods has been to employ a sun planetary gear system, wherein a contact attached to a planet gear can be made to move diametrically across the ring gear as a sinusoidal function of the angular position of the sun gear. Many approximate sine resistance generators, which depend upon winding wire of uniform dimension on a card of varying contour, or wire of varying dimension on a card of uniform contour, or of shunting tappings on a linearly wound resistance by fixed resistances, are also known. Various combinations of the above, and of varying the pitch of winding of uniform wire on a uniform card, have been attempted. Finally a common method is to develop a sine resistance function by contacting a linear resistance winding, on a cylindrical surface, with a wiper which moves along a non-linear helix.

Those employing the planetary gear or the helically moved wiper are the most exact of these schemes, but they are also the most expensive, since the making of gears or non-linear helices requires careful machine operations. The remaining methods though cheaper are mere approximations, whose accuracy is determined by the expenditure permitted in construction.

It has been found possible in employing the present invention to provide an accurate sine-cosine variable resistance without the necessity of resorting to complicated arrangement for this accuracy.

In accordance with the present invention there is provided a sine-cosine variable resistance, comprising a resistance element having a straight line contacting surface (this may be the edge of a wire wound card or other suitable former) the resistance between any two points on the surface being a linear function of the separation of the points (i.e. there is a linear variation of resistance along the line surface), a plane circular wiper for making electrical connection with the surface, means for rotating said wiper for rotation substantially in its plane about an axis through a point on its circumference said axis being perpendicular to the line surface, means for permitting limited inclination of the diameter of the wiper through the point with respect to a right angle to the perpendicular axis, whereby to permit direct connection between the wiper and the surface at only one place, when the wiper is moved to any angular position by said means for rotating (i.e. by rotation about the axis though the point on its circumference) and to obtain a value of resistance between the wiper and the point of intersection of the perpendicular and the surface which varies as the sine or cosine of the angular position of the wiper (dependent of course upon choice of reference position of the wiper).

A description of the invention and of a particular embodiment for carrying it into effect follows and reference will be made to the drawings in which.

Figure 1:
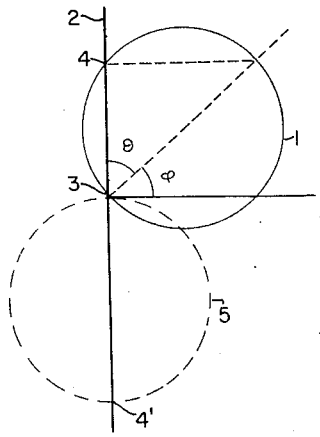
Figure 1 shows a schematic view illustrating the principle employed in the present invention.

The principle of operation of a potentiometer constructed according to the present invention can be understood from Figure 1.

A circular sliding wiper 1 moves over a resistive line surface 2. The resistance between any two points on the line varies linearly with their distance apart. Such a line surface may for instance comprise part of a linearly wound resistance card former. The wiper is pivoted at a point on its circumference about a perpendicular to this line surface 2, which perpendicular strikes the surface at point 3. Electrical connection takes place only between surface 2 and wiper 1 at point 4. As wiper 1 is rotated, say clockwise, about point 3 connection point 4 will move towards 3, coincide with point 3, and then as the wiper moves into the position of dashed circle 5, connection at 4 between circular wiper and surface 2 moves to point $4^1$. As wiper 1 is rotated further, point 4 progressively returns to its original position.

If an electrical circuit is completed between point 3 on surface 2 and the wiper 1, it can be seen that the resistance $r$ between these two is given by $$r = R \cos \theta$$

and $$r = R \sin \varphi$$

where R is the maximum resistance obtainable between wiper and point 3 (i.e. when $\theta = 0$ or $180°$, $\varphi = 90°$ or $270°$).

Figure 2:
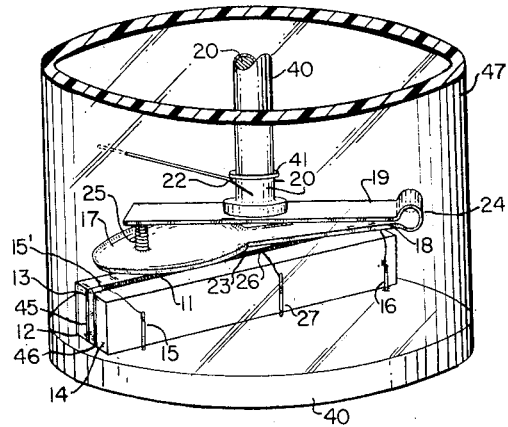
Figure 2 shows a perspective view of a potentiometer constructed according to the present invention.
Figure 3:
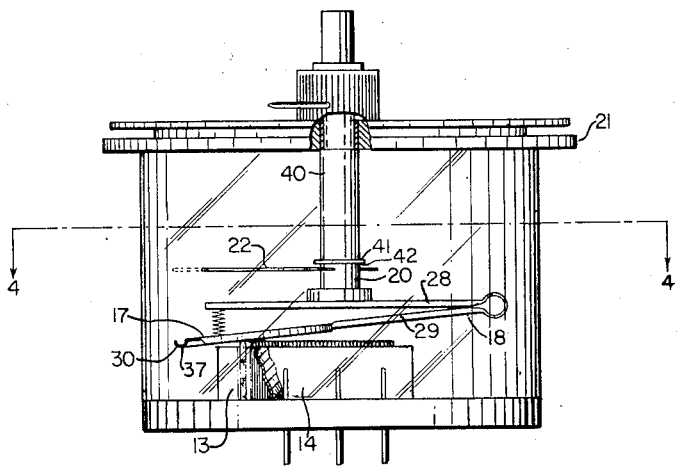
Figure 3 shows a side, partially sectioned elevation of the device of Figure 2.
Figure 4:
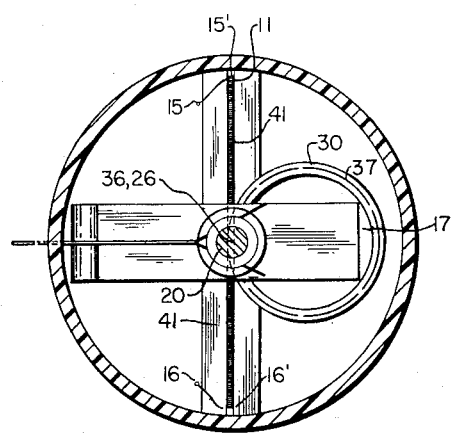
Figure 4 shows a plan view section on line 4—4 of Figure 3.

In a particular embodiment of the invention having reference to Figures 2, 3 and 4, resistance wire 11 of uniform cross sectional area is wound linearly on a card 12. The card is then affixed in an upright position between supporting blocks 13 and 14 mounted on a base 40. Two sets of shims 45 and 46 are placed between blocks 13 and 14 and card 12 whose purpose is described later. One end 15' of the resistance wire 11 is connected to a pin 15, the other end 16' to a pin 16 (see Figure 4). A wiper which comprises a circular-shaped member 17 is spring mounted on an arm 18, 19 from the end of a shaft 20 which depends from the lid 21 of the potentiometer casing 47. Shaft 20 is carried in bushing 40 fixed perpendicularly in lid 21 (see Figure 3). Contact is made to the shaft by a wish-bone arrangement 22 and through members 19 and 18 to the circular slider 17. The slider is pressed against the upper resistive surface 23 of card 12 by the spring action of bent proportion 24 between members 19 and 18 and also if considered necessary by the additional spring 25 between member 19 and circular portion 17. Connection to a centre tapping 26 on surface 23 is provided by pin 27, the tapping being co-incident with the extended centre line of the shaft 20. The structure of the member 17 can be seen in Figures 3 and 5 in which there is a depending circular depression the underside of the trough of which forms a contacting circle 37 for the wire 11 on surface 23. The flange 30 forming the outer wall of the depression strengthens the member 17 against flexing reinforcing brims 28 and 29 (see Figure 3) are also provided to hold arm 18 rigidly during operation of the device. Figure 4 shows that contact circle 37 is so aligned with the axis of shaft 20 that it behaves as a circular contact pivoted at a point 36 on its circumference over the centre tapping 26. Member 17 is inclined slightly towards the axis of shaft 20 (i.e. away from the plane of the perpendicular to the shaft, this inclination is shown exaggerated in Figures 2 and 3) so that contact occurs only in one place on surface 23 for a given position of shaft 20. This inclination should be as small as possible, consistent with manufacturing techniques, so as to avoid second order effects in the relationship of shaft position to resistance value. The diameter of the wiping circle of contact 37 should not be greater than the length occupied on resistance card 12 by the wire 11 from centre tap 26 to either end 15' or end 16' so that contact between member 17 and wire 11 is maintained at all positions of the shaft 20.

Figure 5:
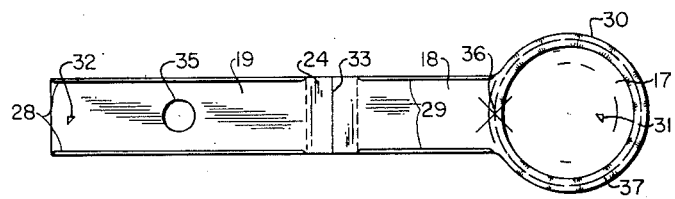
Figure 5 shows a view of the wiper in Figures 2, 3 and 4, before folding.

Figure 5 indicates the method in which the members 17, 18 and 19 can be made from a single piece of material. The circular end 17 is pressed out whilst the material is flat, and at the same time an ear 31 and second ear 32 are punched in the metal for accommodating the ends of spring 25. At this time reinforcing brims 28 and 29 are also formed by turning up the edge of the material. The left hand end of the sheet of metal shown in Figure 5 is then folded about line 23 to produce the cylindrical spring hinge 24 thereby aligning the centre of hole 35 through which the shaft will protrude with the point 36 on the contacting circle 37 of rim 30. The material chosen for members 17, 18 and 19 should be sufficiently ductile to withstand the forming processes just described, firm enough to withstand the distorting stresses applied in operation, but at the same time must be resilient enough for spring portion 24 to behave satisfactorily. Phosphor bronze would be suitable. In adjusting the device for accurate operation the card 12 is moved longitudinally between blocks 13 and 14 until a minimum resistance reading can be obtained at points 180° apart in rotation of the shaft 20. Shims are then interchanged between bunches 45 and 46 until the minimum resistance values are equal and as nearly zero as possible. Final adjustment of this last step can be accomplished by slight longitudinal movement of shaft 20 which will alter the inclination of dish 17 and hence can move contact circle 37 transversely, to card 12. To achieve this movement the number of shim washers 41 between bushing 40 and shoulder 42 on shaft 20 may be altered, or if desired bushing 40 could be moved longitudinally in the direction required. In production, the use of shims will probably be unnecessary and if jigs are used in producing the arm no axial adjustment of shaft 20 should be needed either. Normally the clearance between the point 36 and surface 23, when the rim is contacting near ends 15' or 16' should be about $\frac{1}{32}''$ when the card is $2\frac{3}{4}''$ long.

It will be understood that the present invention lends itself admirably to mass production techniques since many of the operations necessary in its construction can be carried out using a jig set-up. Only linear or circular operations are needed and these are inherently accurate machine procedures. There is no necessity for the construction of complex gearing or difficult shaping and winding of the resistance card. The mounting of the shaft 20 and card 12 is related to circular structures 40, 47 and 21 and it is therefore mechanically simple to place them accurately in position. It is believed that a resistance conformity of ½% of peak to peak resistance value for a $2\frac{3}{4}''$ (or 3" nominal) length card, could be achieved in mass production. It is believed that this will be realizable without any transverse adjustment by use of shims 45 and 46, or longitudinal displacement of card 12, and minor or no adjustment of shaft 20 in a longitudinal direction.

I claim:
1. A sine/cosine variable resistance comprising a resistance element having a straight line contacting surface, the resistance between any two points on the surface being a linear function of the separation of the points, a plane circular wiper for making electrical connection with the surface, a shaft for rotating said wiper for rotation substantially in its plane about an axis through a point on its circumference, said axis being perpendicular to the line surface, means for permitting limited inclination of the diameter of the wiper through the point with respect to a right angle to said perpendicular axis, and spring means for urging said wiper with respect to said shaft towards said surface, whereby to permit connection between said wiper and said surface at only one place when said wiper is moved to any angular position by said shaft, and to obtain a value of resistance between said wiper and the point of intersection of said perpendicular and said surface which varies as the sine/cosine of the angular position of said wiper.

2. A sine/cosine variable resistance as defined in claim 1 comprising means for mounting said wiper on said shaft for inclining movement of the said diameter of the wiper with respect to the axis of rotation of said shaft.

3. A sine/cosine variable resistance as defined in claim 2 wherein said resistance element comprises a wire wound former.

4. A sine/cosine variable resistance as defined in claim 2 comprising an arm for supporting said circular wiper from said shaft, said spring means including a bent portion in said arm fo rproviding spring action for urging said wiper towards said surface.

5. A sine/cosine variable resistance as defined in claim 4 said circular wiper and said arm being pressed from a single piece of material.

References Cited in the file of this patent
UNITED STATES PATENTS

| | | |
|---|---|---|
| 2,208,379 | Luck | July 16, 1940 |
| 2,554,811 | Bromberg et al. | May 29, 1951 |